(12) United States Patent
Chavez Martinez et al.

(10) Patent No.: US 9,937,842 B2
(45) Date of Patent: Apr. 10, 2018

(54) DEBRIS AND LIQUID RETAINING FLOOR AND CARGO MATS

(71) Applicant: GM GLOBAL TECHNOLOGY OPERATIONS LLC, Detroit, MI (US)

(72) Inventors: Alejandro Chavez Martinez, Toluca (MX); Fidel Enrique Zubeldia Cruz, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/209,793

(22) Filed: Jul. 14, 2016

(65) Prior Publication Data

US 2018/0015862 A1 Jan. 18, 2018

(51) Int. Cl.
| | | |
|---|---|---|
| B60N 3/04 | (2006.01) | |
| A47L 23/26 | (2006.01) | |
| A47G 27/02 | (2006.01) | |

(52) U.S. Cl.
CPC ............ *B60N 3/048* (2013.01); *A47L 23/266* (2013.01); *B60N 3/044* (2013.01); *A47G 27/0206* (2013.01)

(58) Field of Classification Search
CPC .......... A47L 23/22; A47L 23/24; A47L 23/26; A47L 23/266; B60N 3/04; B60N 3/044; B60N 3/048; A47G 27/02; A47G 27/0206
USPC ..... 15/112, 161, 215–217, 237–241; 52/177, 52/180, 181; 280/164.2; 296/97.23
See application file for complete search history.

(56) References Cited

U.S. PATENT DOCUMENTS

| | | | | |
|---|---|---|---|---|
| 345,291 | A * | 7/1886 | Fein ........................ | A47L 23/26 15/112 |
| 543,999 | A * | 8/1895 | Morton .................... | A47L 23/22 15/112 |
| 3,087,752 | A * | 4/1963 | Winchester ............ | B60K 26/02 15/215 |
| 3,312,498 | A * | 4/1967 | Stata ...................... | B60N 3/044 180/90.6 |
| 3,605,166 | A * | 9/1971 | Chen ...................... | A47L 23/24 15/215 |
| 5,919,540 | A * | 7/1999 | Bailey .................... | B32B 3/266 15/217 |

FOREIGN PATENT DOCUMENTS

| | | | |
|---|---|---|---|
| CA | 2404566 | * | 9/2002 |
| EP | 379630 | * | 8/1990 |
| GB | 2407765 | * | 5/2005 |
| JP | 1-266034 | * | 10/1989 |
| WO | 91/08701 | * | 6/1991 |

\* cited by examiner

*Primary Examiner* — Mark Spisich
(74) *Attorney, Agent, or Firm* — Quinn IP Law

(57) ABSTRACT

A floor mat or cargo mat includes a primary surface and a tray recessed from the primary surface. The tray defines a debris volume below the primary surface. An abrasive panel covers the tray. The abrasive panel is substantially contiguous with the primary surface and is porous, such that debris and liquids pass through the abrasive panel into the debris volume of the tray.

8 Claims, 2 Drawing Sheets

DEBRIS AND LIQUID RETAINING FLOOR AND CARGO MATS

TECHNICAL FIELD

This disclosure generally relates to floor mats and cargo mats.

BACKGROUND

Footwells in vehicles or other environments provide areas for resting or placing feet of occupants. The footwells may be carpeted or plastic and are often in the vicinity of pedals or of seats in front of the footwell. Some vehicles, such as sport utility vehicles, include cargo mats to protect the trunk or cargo areas.

SUMMARY

A floor mat, which may be a cargo mat, is provided. The floor mat includes a primary surface and a tray recessed from the primary surface. The tray defines a debris volume below the primary surface.

An abrasive panel covers the tray. The abrasive panel is substantially contiguous with the primary surface and is porous. Therefore, debris and liquids pass through the abrasive panel into the debris volume of the tray.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
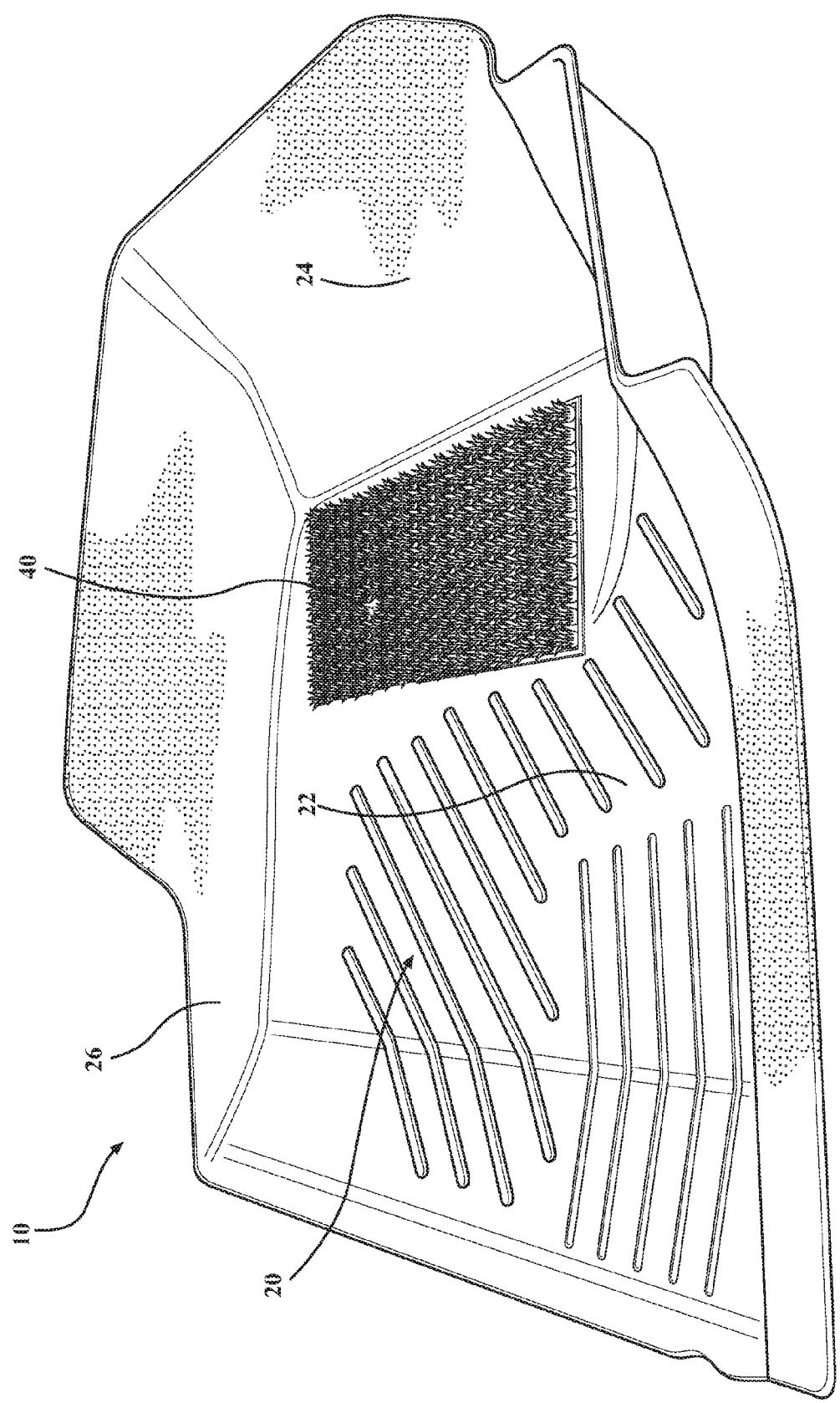
FIG. 1 is a schematic, isometric view of a floor mat for a vehicle, concepts of which may be applied to cargo mats.

Referring to the drawings, like reference numbers correspond to like or similar components whenever possible throughout the several figures. There is shown in FIG. 1 an isometric view of a floor mat 10, which may be disposed in a vehicle (not shown). The floor mat 10 may be located within a footwell—i.e., the recessed compartment in front of the seats—of the vehicle or a cargo area of the vehicle. However, the floor mat 10 may also be used in other areas. As described and illustrated herein, the floor mat 10 generally refers to mats at the feet of occupants, mats located in cargo areas, and mats located in other areas or for other uses.

The floor mat 10 may be used with numerous types of vehicles, including planes, trains, and automobiles. Additionally, heavy industrial, construction, and mining equipment may incorporate features of the floor mat 10 or other components described herein. The floor mat 10 may also be usable in non-vehicular and marine environments. In particular, public transit environments may benefit from the debris and liquid retention and ease of cleaning offered by the floor mat 10. The floor mats 10 described herein may be used in interior or exterior applications.

While the present disclosure may be described with respect to specific applications or industries, those skilled in the art will recognize the broader applicability of the disclosure. Those having ordinary skill in the art will recognize that terms such as "above," "below," "upward," "downward," etcetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIG. 1, the floor mat 10 includes a primary surface 20. For footwells, in particular, the primary surface 20 generally defines the area of the floor mat 10 that is in contact with the footwear (shoes, boots, et cetera) of occupants of the vehicle.

The primary surface 20 shown includes a base plane 22 and a ramp 24. However, in other configurations, such as those for cargo areas, the primary surface 20 may be substantially flat, and may have fewer or additional features. The ramp 24 directs debris and liquids toward the base plane 22. The base plane 22 and the ramp 24 generally track the shape of the footwell or cargo surface onto which the floor mat 10 is installed or placed.

A plurality of edge walls 26 extend away from a periphery of the primary surface 20. In the configuration shown, the edge walls 26 are substantially perpendicular to the primary surface 20. In configurations of the floor mat 10 used in cargo areas, such as the rear cargo area of an SUV, the edge walls 26 may be smaller or may be completely removed.

The primary surface 20 and the edge walls 26 cover portions of the footwell or cargo area of the vehicle. The portions covered may be carpeted or plastic, covered in fabric or leather, or hard surfaces. In general, the floor mat 10 provides a barrier—or collecting area—against debris, including dirt, sand or mud, and moisture, including rain or snow, from coming into contact with the remainder of the vehicle.

Figure 2:
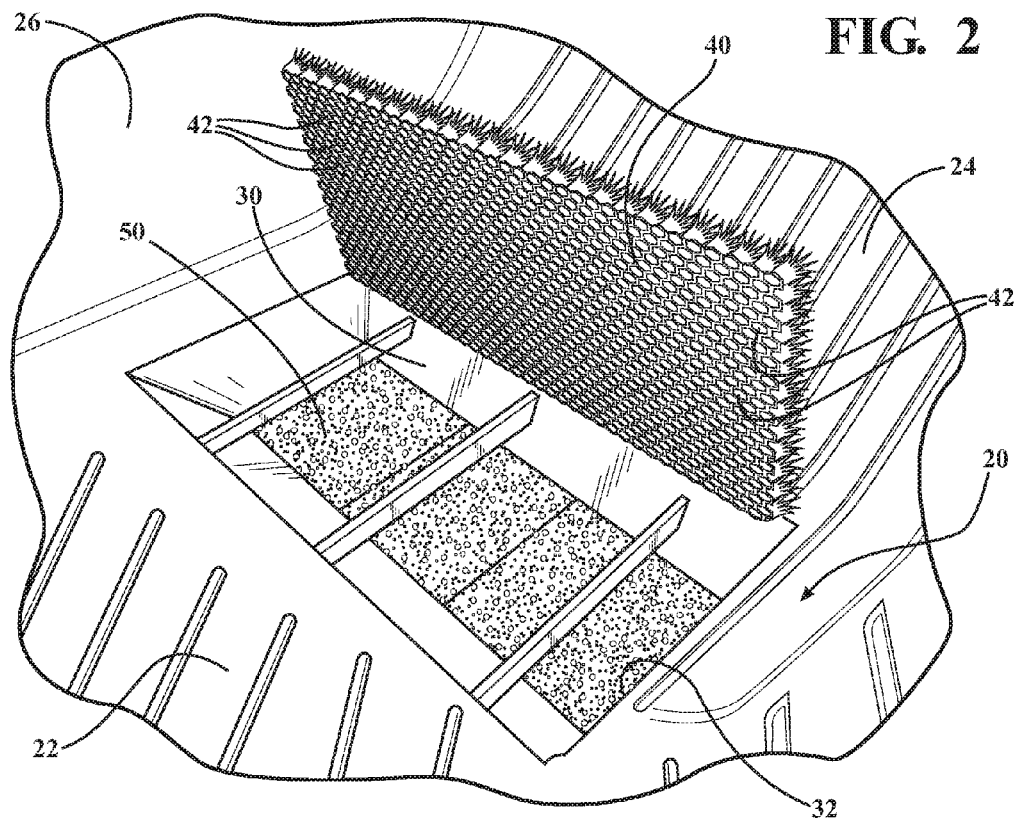
FIG. 2 is a schematic, isometric view of the floor mat of FIG. 1, shown with an abrasive panel rotated to allow access to a tray capable of collected debris and liquids.

Referring also to FIG. 2, and with continued reference to FIG. 1, there is shown another view of the floor mat 10. As viewed in FIG. 2 the floor mat 10 includes a well or tray 30. The tray 30 is offset or recessed from the primary surface 20 and defines a debris volume 32.

An abrasive panel 40 movably covers the tray 30 and the debris volume 32 defined thereby. The abrasive panel 40 is substantially contiguous with the primary surface 20, such that it provides a continuous surface or platform for feet within the footwell or cargo within the cargo area. The abrasive panel 40 is shown closed, or covering, the tray 30 in FIG. 1, and open, or allowing access to, the tray 30 in FIG. 2.

The abrasive panel 40 is porous, such that debris, liquids, and moisture pass through a plurality of holes or pores 42 of the abrasive panel 40 into the debris volume 32 of the tray 30. The abrasive panel 40 may be formed from a number of materials, including, without limitation: metallic screens, wire bristles, and plastic bristles or nubs.

The debris volume 32 of the tray 30 may provide a repository for significant amounts of debris, liquids, and moisture. Unlike a flat mat, the tray 30 allows the debris and moisture to be separated from the feet of occupants.

In addition to allowing debris and moisture to move from the primary surface 20 to the tray 30, via the pores 42, the abrasive panel 40 may provide a rough area for cleaning of shoes or other footwear worn by the occupants. The debris removed by the abrasive panel 40 from footwear will then pass through the pores 42 into the debris volume 32. A similar abrasive panel 40 may be used to cover the tray 30 for the floor mats 10 used in cargo areas. In cargo area applications, the abrasive panel 40 may provide a cleaning surface for other types of gear, including sporting equipment or tools.

The abrasive panel 40 is illustrated as substantially planar and covering only a portion of the base plane 22. However, in other configurations, the abrasive panel 40 may span portions of both the base plane 22 and the ramp 24, such that the abrasive panel 40 may have an angle or bend to match the shape of the transition from the base plane 22 to the ramp 24.

As viewable in FIG. 2, the floor mat 10 includes at least one absorbent pad 50 disposed within the tray 30. The absorbent pads 50 occupy a portion of the debris volume 32. Furthermore, the absorbent pads 50 trap liquids, moisture, and debris within the tray 30, which prevents it from returning to the primary surface 20 and coming into contact with occupants' feet.

Figure 3:
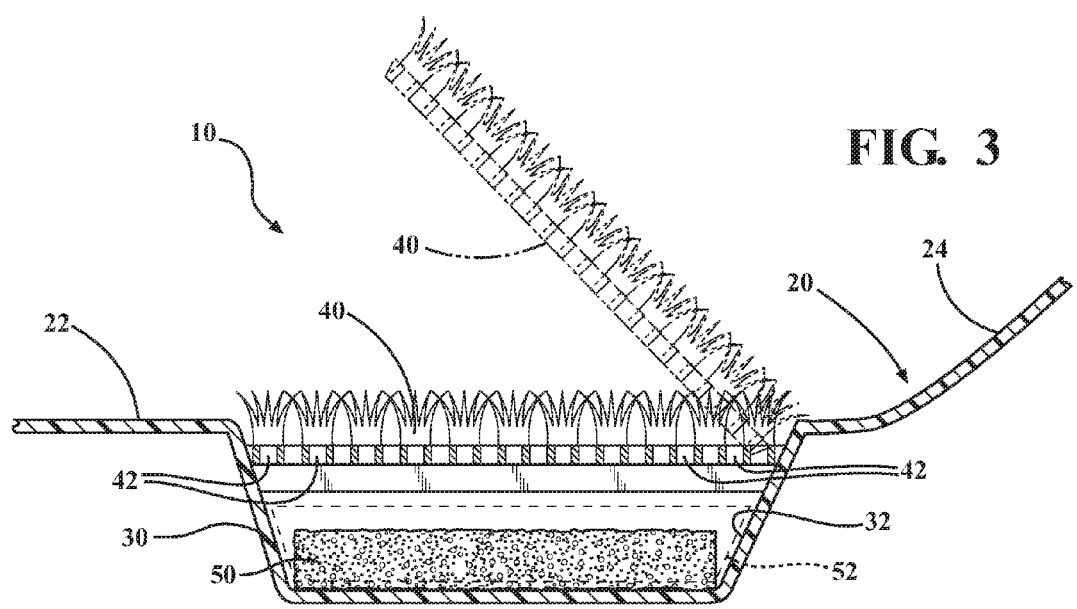
FIG. 3 is a schematic, side view of the floor mat of FIGS. 1 and 2, showing alternate pivot or removal points for the abrasive panel, illustrating access to the tray for removal of sponges therein.

Referring also to FIG. 3, and with continued reference to FIGS. 1-2, there is shown another view of the floor mat 10. FIG. 3 shows a schematic side view illustrating access to the tray 30 through the abrasive panel 40.

As shown in FIG. 3, the abrasive panel 40 allows selective access to the one or more absorbent pads 50. In the configuration shown in FIG. 3, the abrasive panel 40 pivots at the rearward edge, and in the configuration shown in FIG. 2, the abrasive panel 40 pivots at the foreword edge.

In the configuration of the floor mat 10 shown, the absorbent pads 50 are removable from the tray 30 and allow access to the debris volume 32 and to the absorbent pad 50. Therefore, any moisture or debris that is collected by the absorbent pads 50 may be easily removed and cleaned. The absorbent pads 50 may be put back after cleaning or may be replaced with new absorbent pads 50. In some configurations, multiple absorbent pads 50 may be contained within a removable cartridge in order to facilitate removal and replacement of multiple absorbent pads 50 as a single unit.

As shown in FIG. 3, the tray 30 is offset from the primary surface 20. The tray 30 may extend downward into slots formed specifically for the tray 30, or flex space that may otherwise be used as a storage compartment.

The floor mat 10 illustrated in FIG. 3 also shows an alternative access point for the absorbent pads 50. A side door 52 is shown in dashed lines. The side door 52 may be formed in the tray 30 to provide access to the debris volume 32. Therefore, the absorbent pad 50 is removable from the tray 30 without moving the abrasive panel 40.

The detailed description and the drawings or figures are supportive and descriptive of the subject matter discussed herein. While some of the best modes and other embodiments for have been described in detail, various alternative designs, configurations, and embodiments exist.

The invention claimed is:

1. A floor mat, comprising:
   a primary surface, wherein the primary surface defines a front side and back side;
   a tray recessed from the primary surface and defining a debris volume, wherein substantially the entire debris volume is recessed beneath the back side of the primary surface;
   an abrasive panel covering the tray, wherein the abrasive panel is substantially contiguous with the primary surface and is porous, such that debris and liquids pass through the abrasive panel into the debris volume of the tray;
   at least one support member disposed within the debris volume, wherein the abrasive panel rests on the support member;
   an absorbent pad disposed within the tray and occupying a portion of the debris volume, wherein the absorbent pad is below the support member, such that both the support member and the absorbent pad are recessed beneath the back side of the primary surface, and wherein the absorbent pad is removable from the tray; and
   a side door formed in the tray and providing access to the debris volume, such that the absorbent pad is removable from the tray without moving the abrasive panel.

2. The mat of claim 1, wherein the abrasive panel is removable to allow access to the tray and to the absorbent pad.

3. The mat of claim 2, further comprising:
   a plurality of edge walls extending substantially perpendicularly from a periphery of the front side of the primary surface.

4. A floor mat, comprising:
   a primary surface, wherein the primary surface defines a front side and back side;
   a tray recessed from the primary surface and defining a debris volume, wherein substantially the entire debris volume is recessed beneath the back side of the primary surface;
   an abrasive panel covering the tray, wherein the abrasive panel is substantially contiguous with the primary surface and is porous, such that debris and liquids pass through the abrasive panel into the debris volume of the tray;
   at least one support member disposed within the debris volume, wherein the abrasive panel rests on the support member;
   an absorbent pad disposed within the tray and occupying a portion of the debris volume, wherein the absorbent pad is below the support member, such that both the support member and the absorbent pad are recessed beneath the back side of the primary surface;
   a plurality of edge walls extending substantially perpendicularly from a periphery of the front side of the primary surface; and
   a side door formed in the tray and providing access to the debris volume such that the absorbent pad is removable from the tray without moving the abrasive panel.

5. A floor mat, comprising:
   a primary surface;
   a tray recessed from the primary surface and defining a debris volume;
   an abrasive panel covering the tray, wherein the abrasive panel is substantially contiguous with the primary surface and is porous, such that debris and liquids pass through the abrasive panel into the debris volume of the tray;
   an absorbent pad disposed within the tray and occupying a portion of the debris volume, wherein the absorbent pad is removable from the tray; and a side door formed in the tray and providing access to the debris volume such that the absorbent pad is removable from the tray without moving the abrasive panel.

6. The mat of claim 5, wherein the abrasive panel is removable to allow access to the tray and to the absorbent pad.

7. The mat of claim 5, further comprising:
a plurality of edge walls extending substantially perpendicularly from a periphery of the primary surface.

8. The mat of claim 5, wherein the abrasive panel is pivotally attached to the primary surface, such that the absorbent pad is removable from the tray by rotating the abrasive panel.

\* \* \* \* \*